United States Patent [19]

Nakahara et al.

[11] 4,346,947
[45] Aug. 31, 1982

[54] HYDROSTATIC PRESSURE GAS-LIQUID DOUBLE PHASE BEARING

[75] Inventors: Tsunamitsu Nakahara, No. 10-19, 3-chome, Denenchofu, Ota-ku, Tokyo; Hiroshi Aoki, No. 11-6, 1-chome, Minami-Senzoku, Ota-ku, Tokyo, both of Japan; Toru Kurisu, Tokyo, Japan

[73] Assignees: Citizen Watch Company Limited; Tsunamitsu Nakahara; Hiroshi Aoki, all of Tokyo, Japan

[21] Appl. No.: 177,537

[22] Filed: Aug. 13, 1980

[51] Int. Cl.³ .................................................. F16C 32/06
[52] U.S. Cl. ......................................... 308/9; 308/170; 308/240; 308/DIG. 1
[58] Field of Search ................. 308/9, 160, 170, 240, 308/DIG. 1

[56] References Cited

U.S. PATENT DOCUMENTS

| | | | |
|---|---|---|---|
| 2,442,202 | 5/1948 | Hughes-Caley | 308/170 |
| 3,034,837 | 5/1962 | Barker | 308/9 |
| 3,039,830 | 6/1962 | Whitley | 308/9 |
| 3,640,590 | 2/1972 | Beisemann | 308/9 |
| 3,726,573 | 4/1973 | Unno | 308/9 |
| 3,778,123 | 12/1973 | Hendler et al. | 308/9 |
| 3,834,775 | 9/1974 | Tuffias et al. | 308/9 |
| 3,945,692 | 3/1976 | Tsujiuchi | 308/9 |

Primary Examiner—Richard R. Stearns
Attorney, Agent, or Firm—Jordan and Hamburg

[57] ABSTRACT

A hydrostatic pressure bearing has a gas supply port and liquid supply ports on its bearing surface. A thin bearing clearance is defined by a hydrostatic pressure supporting force between the bearing and a rotor supported by the bearing by supplying a pressurized gas to the bearing surface through the gas supply port. A liquid is fed from the liquid supply ports into the bearing clearance to form a thin liquid film in the bearing clearance, and said liquid film reduces the rate of drop of the static pressure of the gas on the bearing surface.

9 Claims, 11 Drawing Figures

HYDROSTATIC PRESSURE GAS-LIQUID DOUBLE PHASE BEARING

The present invention relates to externally pressurized two layer film bearings, and more particularly to a hydrostatic pressure bearing utilizing gas and liquid phases in which a thin liquid layer adhered to one of bearing surfaces increases the hydrostatic pressure supporting force.

Hydrostatic pressure bearings now available may generally be classified into a first type using oil as a pressurized fluid and a second type using ar. The first type of bearings cannot avoid generation of heat in the bearing clearance attributable to the viscosity resistance inherent in oil. The second type of bearings which employ air are therefore utilized for high speed rotary shafts and devices which are susceptible to temperature variations. However, the use of air as a pressurized fluid is not fully acceptable because the load capacity and viscosity attenuation ability are too poor to preclude instability of operation and because the bearings tend to seize. To settle these problems, there have been studied a method which suppresses the rate of pressure fall of the gas on the bearing surface by forming a minute recess thereon and a method which enhances the stability of operation by supplying oil mist from a gas supply port. These methods still involve various problems; the former degrades the viscosity attenuation function though succeeding in increasing the rigidity while the latter presents various difficulties concerning handling such as collection of the oil.

An object of the present invention is to promote easy handling of such a hydrostatic pressure bearing by supplying oil independently of a gas to a separate line, to obtain an effect comparable with that of a pocket without cutting a pocket or like recess on the bearing surface, and, by forming a thin film of oil, to improve the viscosity attenuation ability and achieve a variable restriction effect on the bearing surface while avoiding seizure of the bearing surface even under excessive loads.

Figure 1:
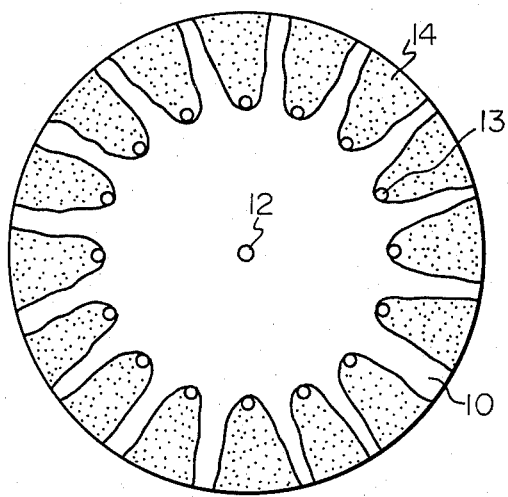
FIG. 1 shows in plan view a bearing surface showing a case in which the relative speed between a thrust bearing and a member supported by the bearing is zero.
Figure 5:
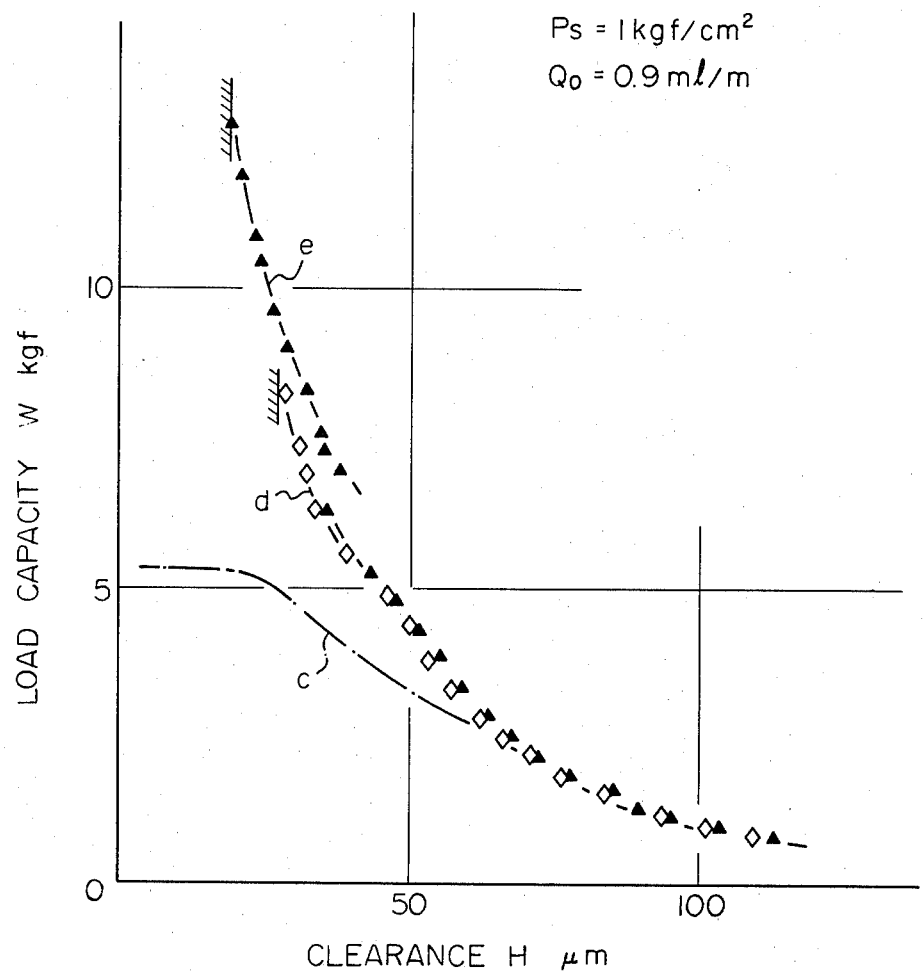
Figure 6:
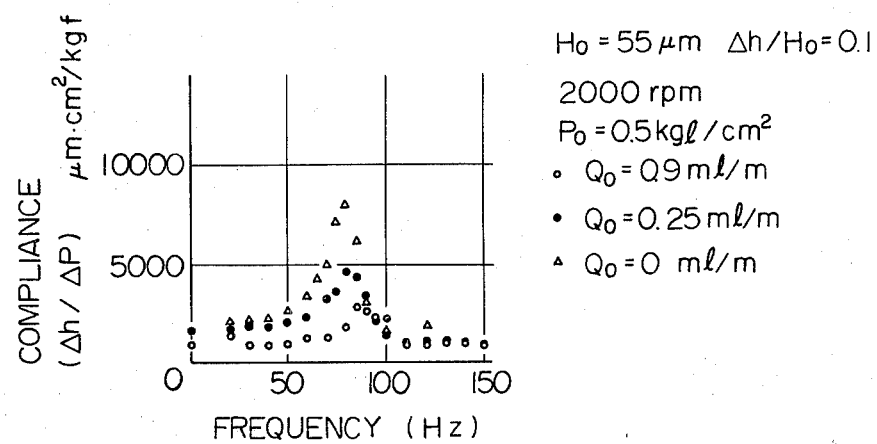
Figure 7:
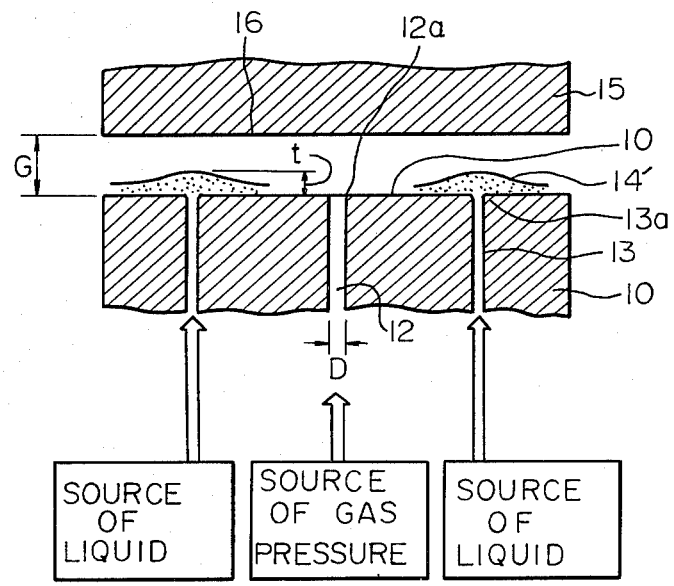
Figure 8A:
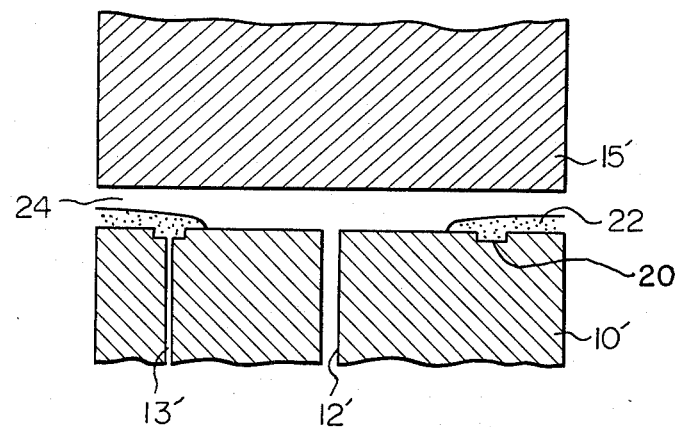
Figure 8B:
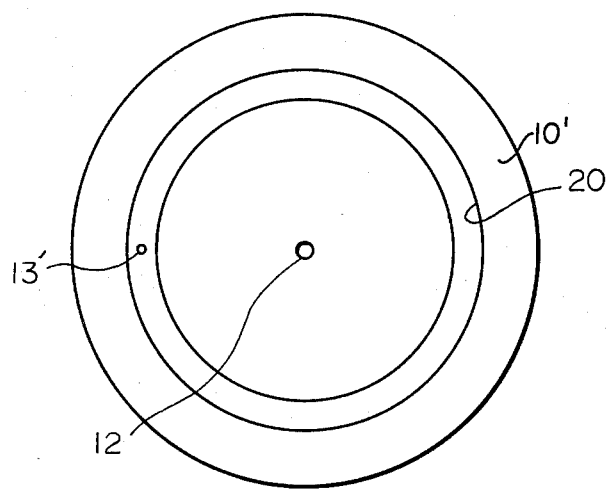
Figure 9:
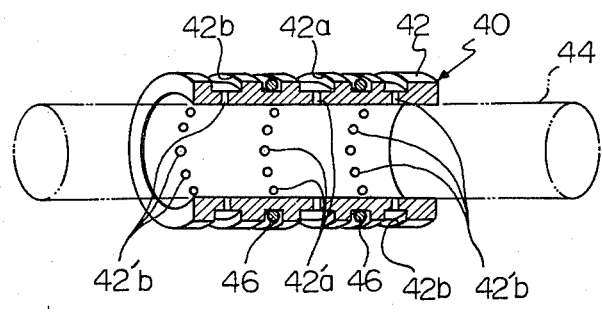
Figure 10:
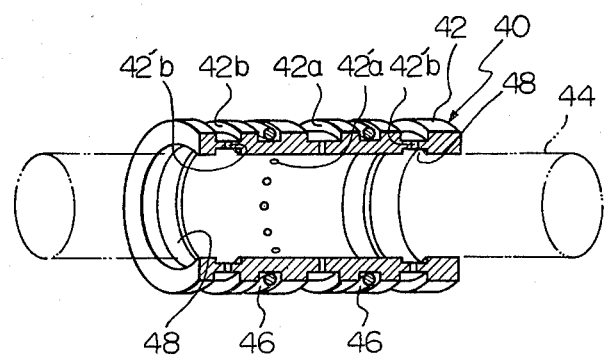

FIG. 5 demonstrates a load characteristic of the bearing of FIG. 1;

FIG. 6 is a graph showing the relationship between the compliance and the frequency;

FIG. 7 is a modification of the bearing according to the present invention;

FIGS. 8A and 8B shown another modification of the bearing according to the present invention;

FIG. 9 is a preferred example of a radial bearing according to the present invention;

FIG. 10 is a modification of the bearing shown in FIG. 9.

Figure 2:
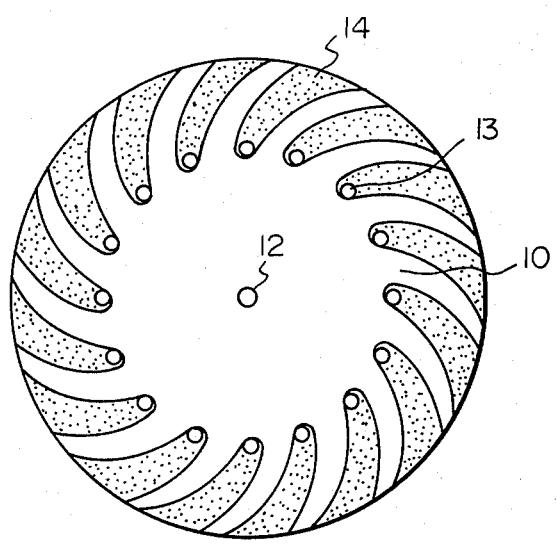
FIG. 2 is a plan view of the bearing surface where the relative speed is very high.
Figure 3:
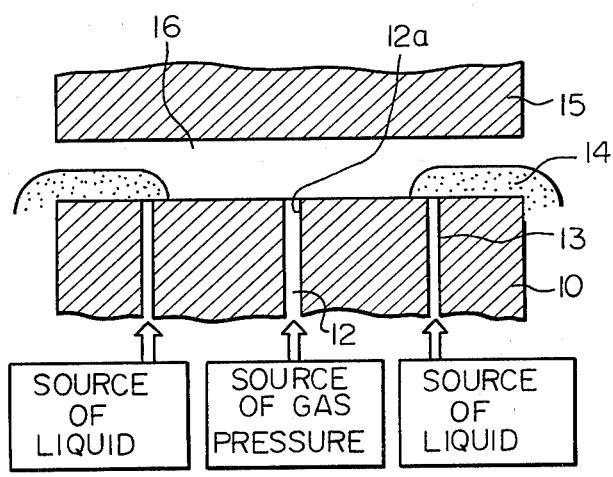
FIG. 3 is a cross sectional view of the bearing of FIG. 1 along the center thereof.
Figure 4:
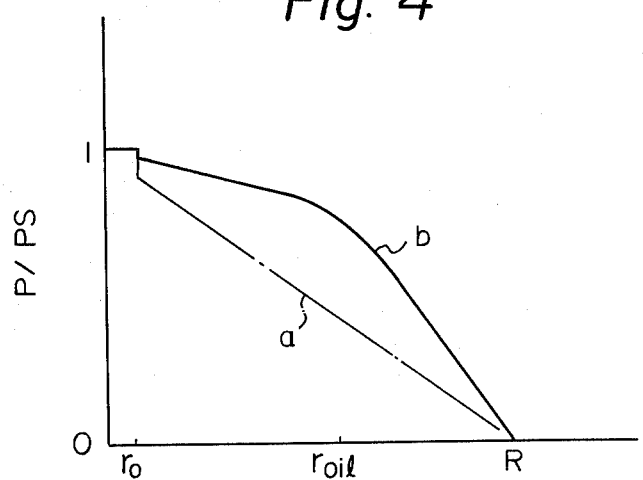
FIG. 4 is a graph showing a pressure distribution in the bearing of FIG. 1.

A preferred embodiment of the present invention will be described with reference to the accompanying drawings which show a thrust bearing for illustrative purpose. Referring to FIGS. 1-3, the bearing generally designated by the reference numeral 10 has a central hole serving as a gas supply passageway 12 extending therethrough to open at the bearing surface. Air under pressure fed through the passageway 12 forms a bearing clearance 16 between the bearing 10 and a rotor 15 to be supported by the bearing. The bearing 10 also has a row of a plurality of small holes 13 arranged substantially concentrically around the air supply passageway 12 as viewed in plans of FIGS. 1 and 2. A liquid reaching the clearance 16 through the passageways 13 forms a thin film 14 on the bearing surface which functions to restrict the surface. This maintains the pressure level in the area surrounded by the passageways 3 as if cut a pocket on the bearing surface even in a hydrostatic pressure bearing of the type having a self-restriction function which originates from the resistance of a fluid in the annular area defined by the port 12a and clearance 16. FIG. 4 shows the result of experiments conducted with the illustrated design of bearing to determine the actual pressure distribution on the bearing surface. In FIG. 4, dash-and-dot curve a indicates a case without the liquid film and solid curve b a case with the liquid film. Denoted by PS in FIG. 4 is a pressure outside the air supply passageway, P a pressure at a measured portion, ro the radius of the air supply passageway, roil the distance from the center of the bearing to the liquid supply passageways, and R the radius of the bearing. While the pressure distribution shown in FIG. 4 holds true also in the case of FIG. 2 wherein the relative speed is very high, it will be understood that upon contact of the film 4 with the member 15 the resistance attributable to the viscosity of the oil would sharply increase the friction torque between the bearing and member 15 or varies the clearance 16. This unwanted phenomenon can be prevented merely by selecting the viscosity and amount of supply of the liquid and the gas supply pressure properly in accordance with the bearing gap and operating speed of the shaft. Thus, compared with traditional hydrostatic pressure bearings which rely only on the changes in gas supply pressure for adjustment, the bearing according to the invention has a wide range of application due to its large number of adjustable factors.

FIG. 5 is a plot demonstrating the load characteristic of the illustrated bearing determined by experiments. Curve c represents a theoretical value of a hydrostatic pressure air bearing, curve d a value corresponding to the rotation of the member supported by the bearing at 2000 rpm, and curve e a value obtained with a 6000 rpm rotation of the supported member. Denoted by QO is the amount of liquid supply; the hatched areas bring about the aforementioned trouble and therefore may be considered to indicate usable limits. It will be seen from FIG. 5 that, compared with conventional hydrostatic pressure air bearings, the bearing embodying the present invention has its rigidity and load capacity increased by several times.

Experiments also revealed that the illustrated design of bearing minimizes the necessary amount of air consumption, maximizes the viscosity attenuation and therefore the stable range of operation, and has a coefficient of friction equivalent to that of a hydrostatic pressure air bearing since the liquid film 14 on the bearing surface remains clear of the member 15 supported by the bearing. Where use is made of oil as the liquid, no anti-corrosion measures are naturally required. It will be noted that, though the present invention has been shown and described in connection with a thrust bearing, it is similarly applicable to a journal bearing, a plane bearing used for sliding actions or like bearing whose bearing pad has a shape different from the illustrated configuration, as will be described later.

FIG. 6 shows a graph illustrating the relationship between the frequency and the compliance which is the ratio between the amount Δh of variations in gap and the amount Δp of variations in pressure as a parameter of the amount of oil supply. As seen in FIG. 6, the compliance will decrease with the increase in the amount of oil supply, and the dynamic rigidity will increase.

FIG. 7 shows a modification of the bearing shown in FIG. 3. In FIG. 7, each of the passageways 13 has a rounded edge 13a which allows a thin film 14' to be formed. Namely, the thickness t of the oil film 14' is small and the bridge effect is not produced. With this arrangement, the gap G between the stator 10 and the rotor 15 becomes minimum and the rigidity and the load capacity will remarkably increase. This is due to the fact that the thin oil film prevents the formation of turbulent flow of air to enable the air pressure to equally act on the surface of the rotor whereby the self-vibrating action of the rotor can be prevented and the stable rotation of the rotor can be obtained. It should be noted that the diameter D of air passageway 12 is preferably determined to be larger than the gap G between the stator 10 and the rotor 15.

FIGS. 8A and 8B shows a further modification of the bearing. In this modification, the stator 10' has an annular groove 20 with which an oil passageway 13' communicates to supply an oil to the annular groove 20. A layer 22 of oil is formed in a circular shape around the annular groove 20 to provide a venture portion 24 through which air will flow to float the rotor 15'.

FIG. 9 shows partially cut away perspective view of a radial bearing 40 embodying the present invention. The bearing 40 comprises a cylindrical body 42 by which a shaft 44 is rotatably supported. The cylindrical body 42 has an outer wall formed with an intermediate annular groove 42a serving as an air passageway, and a pair of annular grooves 42b serving as oil passageways. The air passageway 42a communicates with a plurality of ports 42'a to provide an air under pressure to a space between an inner wall of the cylindrical body 42 and an outer periphery of the shaft 44. Each of the oil passageways 42b communicates with a plurality of ports 42'b, through which oil is supplied to the space between the inner wall of the cylindrical body 42 and the outer periphery of the shaft 44 to form an oil film therebetween. In operation, air under pressure supplied through the ports 42'a passes in the form of a layer between the oil film on the inner wall of the cylindrical body 42 and the outer periphery of the shaft to thereby rotatably support the shaft 44. Indicated at 46 is a sealing ring to interrupt communication between the air passageway 42a and the oil passageway 42b.

FIG. 10 shows a modification of the radial bearing shown in FIG. 9. In this modification, each of the oil passageways 42b communicates with an inwardly radially facing annular groove 48 through port or ports 42'b. The oil delivered to each of the annular grooves 48 is formed into an oil film similar that shown in FIG. 8A and, therefore, a detailed description of the operation is herein omitted.

It will now be appreciated from the foregoing description that in accordance with the present invention a highly reliable bearing can be obtained.

While the present invention has been shown and described with reference to particular embodiments by way of example only, it should be noted that any other modifications may be made without departing from the scope of the present invention. For example, a principal concept of the present invention may be applied to devices other than bearings, such as static pressure screws, etc.

What is claimed is:

1. A hydrostatic pressure bearing for a rotor having a bearing surface, comprising:
   a stationary body having a bearing surface and spaced from the bearing surface of said rotor by a predetermined clearance;
   a central gas passageway formed in a central part of said stationary body and communicating with a source of gas under pressure, said gas passageway opening to said clearance to form a gas film therebetween; and
   liquid passageway means circumferentially formed in said stationary body around said central gas passageway and communicating with a source liquid, said liquid passageway means opening to said clearance to provide a thin liquid film which is adhered to the bearing surface of said stationary body in a circle shape during rotation of said rotor;
   whereby said gas under pressure flows between said thin liquid film and the bearing surface of said rotor to rotatably support said rotor.

2. A hydrostatic pressure bearing according to claim 1, in which said gas passageway and said liquid passageway means open to said clearance at a co-planar surface.

3. A hydrostatic pressure bearing according to claim 1 or 2, in which each of said liquid passageway means has a port formed with a rounded edge to form said gas film.

4. A hydrostatic pressure bearing according to claim 1, in which said stationary body has an annular groove formed on the bearing surface of said stationary body and communicating with said liquid passageway means.

5. A hydrostatic pressure bearing according to claim 1, in which said gas passageway has a diameter larger in value than the thickness of said clearance.

6. A hydrostatic pressure bearing according to claim 1, in which said liquid is an oil.

7. A hydrostatic pressure bearing according to claim 1, in which said liquid is an oil containing a gaseous component.

8. A hydrostatic pressure bearing for a shaft having an outer bearing surface, comprising:
   a cylindrical body having an inner bearing surface and spaced from the bearing surface of said shaft by a predetermined clearance;
   central gas passageway means formed in a central part of said cylindrical body and communicating with a source of gas under pressure, said gas passageway opening to said clearance to form a gas film therebetween; and
   first and second liquid passageway means formed in said cylindrical body on both sides of said central gas passageway means and communicating with a source liquid, said liquid passageway means opening to said clearance to provide first and second thin liquid films which are adhered to the bearing surface of said cylindrical body during rotation of said shaft;
   whereby said gas under pressure flows between said thin liquid films and the bearing surface of said rotor to rotatably support said shaft.

9. A hydrostatic pressure bearing according to claim 8, in which said cylindrical body has formed on its inner bearing surface first and second annular grooves communicating with said first and second liquid passageway means.

* * * * *